United States Patent
Prasad et al.

(10) Patent No.: US 9,225,751 B2
(45) Date of Patent: Dec. 29, 2015

(54) PROTECTION AGAINST UNSOLICITED COMMUNICATION FOR INTERNET PROTOCOL MULTIMEDIA SUBSYSTEM

(75) Inventors: Anand Raghawa Prasad, Tokyo (JP); Andreas Kunz, Heidelberg (DE); Toshiyuki Tamura, Tokyo (JP); Stefan Schmid, Heidelberg (DE); Thilo Ewald, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 469 days.

(21) Appl. No.: 13/122,263

(22) PCT Filed: Oct. 6, 2009

(86) PCT No.: PCT/JP2009/067691
§ 371 (c)(1),
(2), (4) Date: Aug. 3, 2011

(87) PCT Pub. No.: WO2010/041758
PCT Pub. Date: Apr. 15, 2010

(65) Prior Publication Data
US 2011/0289217 A1    Nov. 24, 2011

(30) Foreign Application Priority Data
Oct. 6, 2008   (JP) .............................. P2008-260090

(51) Int. Cl.
  *H04L 12/16* (2006.01)
  *H04L 29/06* (2006.01)
(52) U.S. Cl.
  CPC ........ *H04L 65/1016* (2013.01); *H04L 65/1006* (2013.01); *H04L 65/1079* (2013.01)
(58) Field of Classification Search
  CPC . H04L 65/1016; H04L 63/1441; H04L 51/12; H04L 63/14; H04L 63/0227
  USPC ........................................................ 709/203
  See application file for complete search history.

(56) References Cited

U.S. PATENT DOCUMENTS

2007/0039040 A1* 2/2007 McRae et al. ..................... 726/4
2007/0071200 A1* 3/2007 Brouwer .................. 379/142.05

(Continued)

FOREIGN PATENT DOCUMENTS

CN        1902877 A    1/2007
JP    2004-282115 A   10/2004

(Continued)

OTHER PUBLICATIONS

International Search Report for PCT/JP2009/067691 mailed Jan. 14, 2010.

(Continued)

*Primary Examiner* — Ruolei Zong

(57) ABSTRACT

A PUCI system is designed to process an incoming call originated by the user equipment toward the counterpart user equipment via an EMS node having a PUCI-light functionality, which includes an IBCF/I-CSCF, a S-CSCF, and a database storing the PUCI-light information. Through a query to the database indicating a suspicious session in relation to the incoming call, the IMS node immediately blocks the suspicious session or simply marks the suspicious session for the further processing at a subsequent node. The reason for rejection is included in a SIP BYE/ERROR message of an original session setup message, which is interpreted by a previous IMS node so as to obtain the relevant information from a SIP header. The relevant information is stored in either a global operator policy database or a local database, thus enabling a PUCI-negating IMS node to reject an unsolicited call related to the blocked session.

7 Claims, 4 Drawing Sheets

(56) References Cited

U.S. PATENT DOCUMENTS

| | | | |
|---|---|---|---|
| 2007/0150773 A1* | 6/2007 | Srivastava | 714/49 |
| 2008/0134285 A1* | 6/2008 | Kim et al. | 726/1 |
| 2009/0077616 A1* | 3/2009 | Lindholm et al. | 726/1 |

FOREIGN PATENT DOCUMENTS

| | | |
|---|---|---|
| JP | 2005-311707 A | 11/2005 |
| JP | 2006-74603 A | 3/2006 |
| JP | 2007-116542 A | 5/2007 |
| JP | 2009-538008 A | 10/2009 |
| WO | 2007/134810 A1 | 11/2007 |

OTHER PUBLICATIONS

ETSI TR 187 009 V2.1.1, "Telecommunications and Internet Converged Services and Protocols for Advanced Networking (TISPAN); Feasibility study of prevention of unsolicited communication in the NGN", Jul. 2008.

Chinese Office Action for CN Application No. 200980139675.1 issued on May 30, 2013 with English Translation.

Japanese Office Action for JP Application No. 2011-529768 mailed on Sep. 3, 2013 with English Translation.

* cited by examiner

PROTECTION AGAINST UNSOLICITED COMMUNICATION FOR INTERNET PROTOCOL MULTIMEDIA SUBSYSTEM

The present application is the National Phase of PCT/JP2009/067691, filed Oct. 6, 2009, which claims priority based on Japanese Patent Application No. 2008-260090, the content of which is incorporated herein by reference.

TECHNICAL FIELD

The present invention relates to the protection against unsolicited communications for Internet protocol multimedia subsystems.

The present application claims priority based on Japanese Patent Application No. 2008-260090, the content of which is incorporated herein by reference.

BACKGROUND ART

Internet protocol multimedia subsystems (IMS) integrate networks such as public switched telephone networks (PSTN) and mobile communication networks so as to provide users (or subscribers) with various communication services, wherein the IMS serving as a pivotal role in the next generation network (NGN) is standardized by the third generation partnership project (3GPP).

Electronic mailing services have suffered from social problems such as Spam and unsolicited (or junk) mails, which are unwanted mails unilaterally sent to recipients by senders. Unsolicited communications occur due to various factors derived from the popularization of the Internet, such as significant decreases of communication costs and advanced capabilities of network access terminals (such as personal computers purchasable by common users) transmitting numerous electronic mails to unspecified persons or sites.

The above problem (already occurring in electronic mailing services) seems to occur in the IMS due to its popularization. The 3GPP specification has initiated the protection against unsolicited communication for IMS (simply referred to as "PUCE") to protect users from Spam over the IP telephony (SPIT).

DISCLOSURE OF INVENTION

For the establishment of sessions binding operators, all operators do not necessarily have networks each enhanced in terms of the PUCI functionality for testing whether or not incoming calls are unsolicited calls. When the PUCI functionality is available only in the terminating network, other intermediate networks need to route incoming calls to the terminating network. This potentially results in a high workload of networking, since unsolicited calls or malicious calls are not detected but directly rejected by the originating network. Currently, it is impossible to detect unsolicited calls without implementing the overall PUCI functionality. The inventors seek to provide solutions as to how to benefit networks with the basic PUCI functionality by way of small changes of networking, thus demonstrating a high performance of the PUCI system.

The present invention seeks to solve the above problem by way of the following key features and effects.

(1) The PUCI system enables peering networks to carry out the PUCI functionality by integrating the basic or "PUCI-light" functionality in IMS nodes without implementing full PUCI feature sets based on global operator policy (OP) databases or local databases, wherein suspicious session information is still maintained.

(2) The PUCI-light functionality (assigned to regular IMS nodes) queries the PUCI-light information database upon processing of a new session, wherein when the database query indicates a suspicious session, the PUCI-light functionality immediately blocks the session or simply marks the suspicious session for further PUCI processing in subsequent nodes.

(3) The PUCI-light functionality is supported by the mechanism to send back the relevant PUCI information (or feedbacks) regarding PUCI applications/tests to previous IMS nodes (including the originating network) involved in the establishment of sessions.

(4) The PUCI-light functionality (assigned to standard IMS nodes) interprets feedbacks derived from PUCI applications/tests (which are performed subsequently) and stores the relevant PUCI information in either global operator policy (OP) databases or local databases (e.g. edge nodes of the core network). The relevant PUCI information stored in global/local databases enable PUCI-negating IMS nodes to reject unsolicited calls (or calls previously rejected by PUCI application servers) in a later stage.

(5) The PUCI-light functionality constitutes a part of the core IMS functionality (including a proxy call session control function (P-CSCF), an interrogating call session control function (I-CSCF), a serving call session control function (S-CSCF) and an interconnect border control function (IBCF), or a session initiation protocol based (SIP-based) system. e.g. SIP proxy/server, SBC, etc.), thus providing the PUCI-light functionality at the edge of each network.

(6) It is possible to improve the overall performance because the PUCI-light functionality at the edge of each network relies on only the database query.

(7) The PUCI-light functionality takes the information configuration (e.g. the trust level of source/domain PLMN by O&M) into account.

(8) The PUCI-light functionality considers only the feedbacks or relevant PUCI information derived from trusted networks.

BEST MODE FOR CARRYING OUT THE INVENTION

Figure 1:
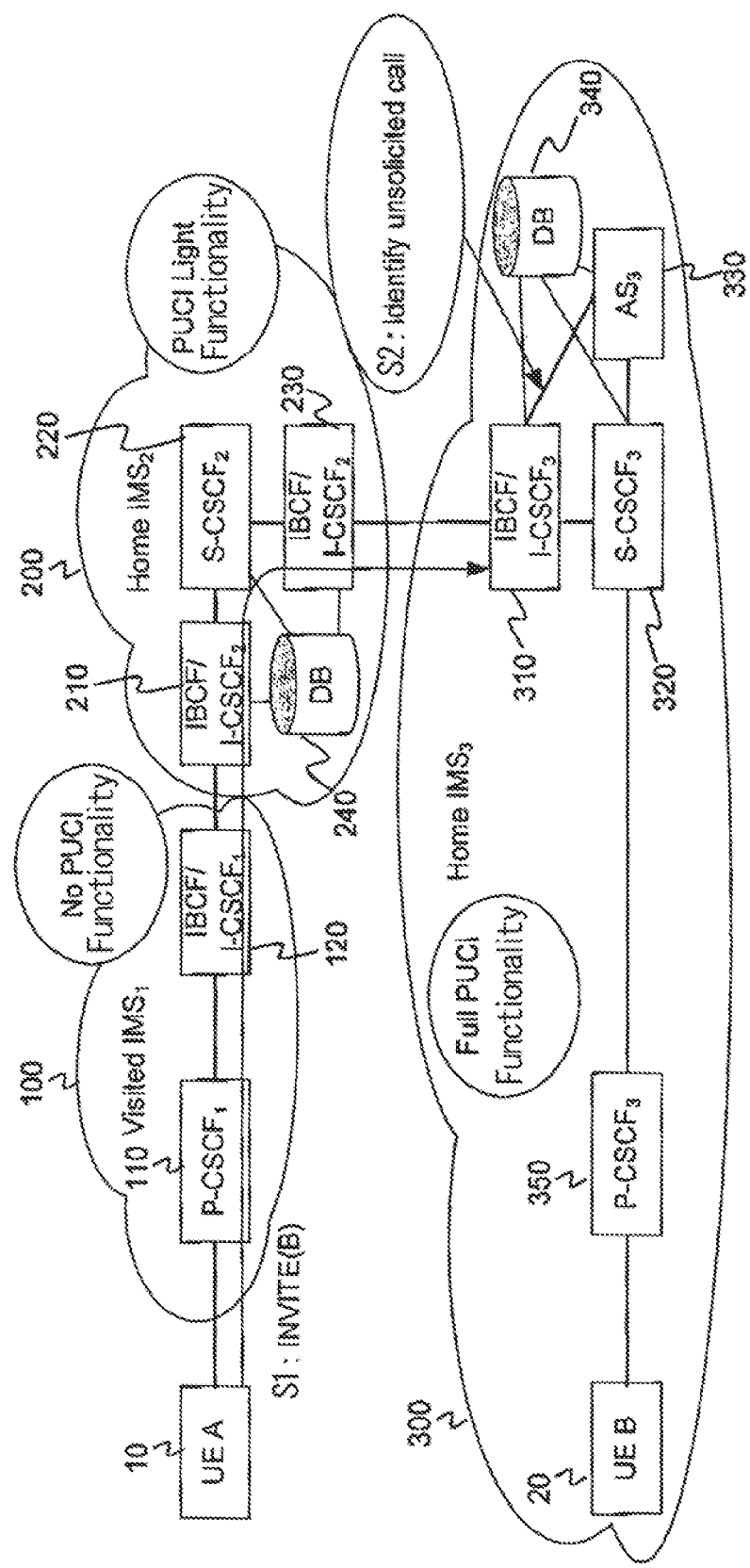
FIG. 1 is a block diagram showing the constitution of a PUCI system for transferring calls between originating user equipment and destined user equipment via different networks in accordance with a preferred embodiment of the present invention, which is used to explain steps S1 and S2 in processing calls.

The overall PUCI functionality is reduced to a limited functionality which is directly implemented as a part of the IMS. The present invention seeks a method as to how to exchange the PUCI information related to specific calls among the interconnected networks, thus directly blocking further unsolicited communications.

The present invention is designed to implement one of global operator policy (OP) databases in the first contact point of the user equipment (UE) to the IMS, and the proxy call session control function (P-CSCF) or the interconnect border control function (IBCF) and/or the interrogating call session control function (I-CSCF) in the case of the IMS peering. The PUCI-light functionality is implemented not only as a part of the core IMS functionality (i.e. an integral part of the P-CSCF, I-CSCF, S-CSCF, and IBCF) but also as any other SIP-based systems (e.g. SIP proxy/server, SBC), thus achieving the PUCI-light functionality at the edge of the network.

The above nodes are enhanced to fulfill additional tasks, such as a database lookup related to an incoming call setup request (SIP INVITE). The database is queried directly by either a first-hop IMS node (e.g. P-CSCF, or IBCF/I-CSCF) or a PUCI application server:

A further optimization is to store the PUCI-light related information directly in the first-hop IMS node, thus optimizing the system operation. Additionally, a new indication is made by way of pre-checking based on OP databases, wherein the pre-check information is delivered to the counterpart nodes. It is beneficial to perform first checking in the first contact point of the network, thus making it possible to rapidly reject unsolicited calls before causing high overheads in the network. This is also beneficial for the operator to improve the overall network performance. It is necessary to store the PUCI information in databases of edge nodes (e.g. P-CSCF, IBCF/I-CSCF) of the network providing the best performance, whereas the S-CSCF and any other nodes are also capable of storing the PUCI information. The OP database includes blacklist/whitelist databases and trusted/distrusted network databases in edge nodes, which are updated by use of the PUCI information which is an indication in a SIP header describing a type of mismatch currently occurring.

The session-related PUCI information includes the following parameters.

(a) Source and/or destination SIP URI dependent upon the reason for blocking the session, wherein a tuple source/destination SIP URI is essential in a personal blacklist, while only the source SIP URI is essential in a global blacklist.
(b) Source/destination IP addresses dependent upon the reason for blocking the session, wherein a tuple source/destination SIP URI is essential in the personal blacklist, while only the source SIP URI is essential in the global blacklist.
(c) Source PLMN/Operator network (where PLNM stands for "Public Land Mobile Network").
(d) SDP information (where SDP stands for "Service Delivery Platform").
(e) An original-session establishment/rejection time.
(f) A subsequent-session establishment/rejection time.
(g) Standardized PUCI testing result/code.

The following ideas are realized with respect to the PUCI information.
(1) Just a flag in a SIP BYE/ERROR message of an original session setup (INVITE) message, which is interpreted by previous IMS nodes. These nodes acquire the relevant PUCI information (e.g. source, destination, IP address, time, etc.) from SIP headers.
(2) A standardized code which informs each PUCI-light node of the reason for PUCI rejection (where "01" denotes the personal blacklist, "02" denotes the global blacklist, "03" denotes the personal/global blacklists, and "04" denotes other parameters) in the SIP BYE/ERROR message of the original session setup (INVITE) message, which is interpreted by previous IMS nodes. These nodes acquire the relevant PUCI information from SIP headers, wherein the relevant PUCI information is provided in the form of a new SIP header (referred to as a P-PUCI-Infor header) later.
(3) "Out-of-band" signaling of the PUCI information between PUCI applications/tests and PUCI-light databases is provided across or within the operator network.
(4) The PUCI-light functionality stores the relevant PUCI information in either the OP database or the local database (i.e. directly in the edge node of the core network), alternatively in global/local databases. This enables PUCI-negating IMS nodes to reject related unsolicited calls (or calls previously rejected by a real PUCI application server) in the later stage.
(5) The PUCI information is stored in one global database per each operator.
(6) The PUCI information is stored in each local network maintained by each network node. Local networks are synchronized with each other.
(7) The PUCI information is stored in plural databases maintained by different operators which are interconnected together so as to receive updates when unsolicited calls are identified.
(8) The PUCI information is stored in one centralized database which is shared by different operators or which is hosted by an operator organization like GSMA.

The present invention will be described in further detail with reference to FIGS. 1 to 4 by way of the processing of incoming calls over various networks. That is, the present invention refers to a scenario in which originating user equipment is roaming in a visited IMS network (i.e. "Visited $IMS_1$") 100 so as to place a call toward a subscriber in a home IMS network (i.e. "Home $IMS_3$") 300. The Visited IMS1 does not have the PUCI functionality, but a home IMS network (i.e. "Home $IMS_2$") 200 is enhanced with the PUCI-light functionality and is thus able to receive the PUCI information related to outgoing calls toward other operators and to store the PUCI information in its database. Thus, it is possible to interconnect the databases of different peering networks (each storing the PUCI information). Alternatively, peering networks share the same database hosted by the operator organization like GSMA. Networks equipped with the limited PUCI functionality may utilize the PUCI information regarding suspicious subscribers when they are roaming or placing calls to be terminated by themselves. The Home $IMS_3$ supports the full PUCI functionality which marks suspicious calls with the PUCI information based on test results, which may be reused later by other operators to update their databases.

FIGS. 1 to 4 are block diagrams used for explaining the principle how to detect unsolicited calls in the Home $IMS_2$ 200 with the minimal PUCI functionality, wherein both operators use their own databases which are not synchronized with each other. Herein, an originating user terminal (UE A) 10 places a call toward a destined user terminal 20 (UE B) 20 in the Home $IMS_3$ 300 via the Visited $IMS_1$ 100 and the Home $IMS_2$ 200. The Visited $IMS_1$ negating the PUCI functionality includes a $P-CSCF_1$ 110 and an $IBCF/I-CSCF_1$ 120; the Home $IMS_2$ supporting the PUCI-light functionality includes an $IBCF/I-CSCF_2$ 210, a $S-CSCF_2$ 220, and an $IBCF/I-CSCF_2$ 230 in conjunction with a database (DB) 240; and the Home $IMS_3$ 300 supporting the full PUCI functionality includes an $IBCF/I-CSCF_3$ 310, a $S-CSCF_3$ 320, an application server $(AS_3)$ 330 in conjunction with a database (DB) 340 as well as a $P-CSCF_3$ 350 connected to the user equipment (UE B) 20.

(Step S1)

In FIG. 1, the user equipment 10 sends a SIP INVITE toward the user equipment 20. The Visited $IMS_1$ negating PUCI testing directly forwards an incoming call to the home IMS of the user equipment 10. Since the Home $IMS_2$ 200 does not have any entry regarding the user equipment 10 in the database 240, it routes the incoming call to the terminating network.
(Step S2)

The incoming call arrives at the edge node of the Home $IMS_3$ 300 including the user equipment 20. Herein, the $IBCF/I-CSCF_3$ 310 directly interacts with the PUCI application server $(AS_3)$ 330 so as to perform the PUCI processing, in which the incoming call is identified as an unsolicited call, for example.
(Step S3)

Figure 2:
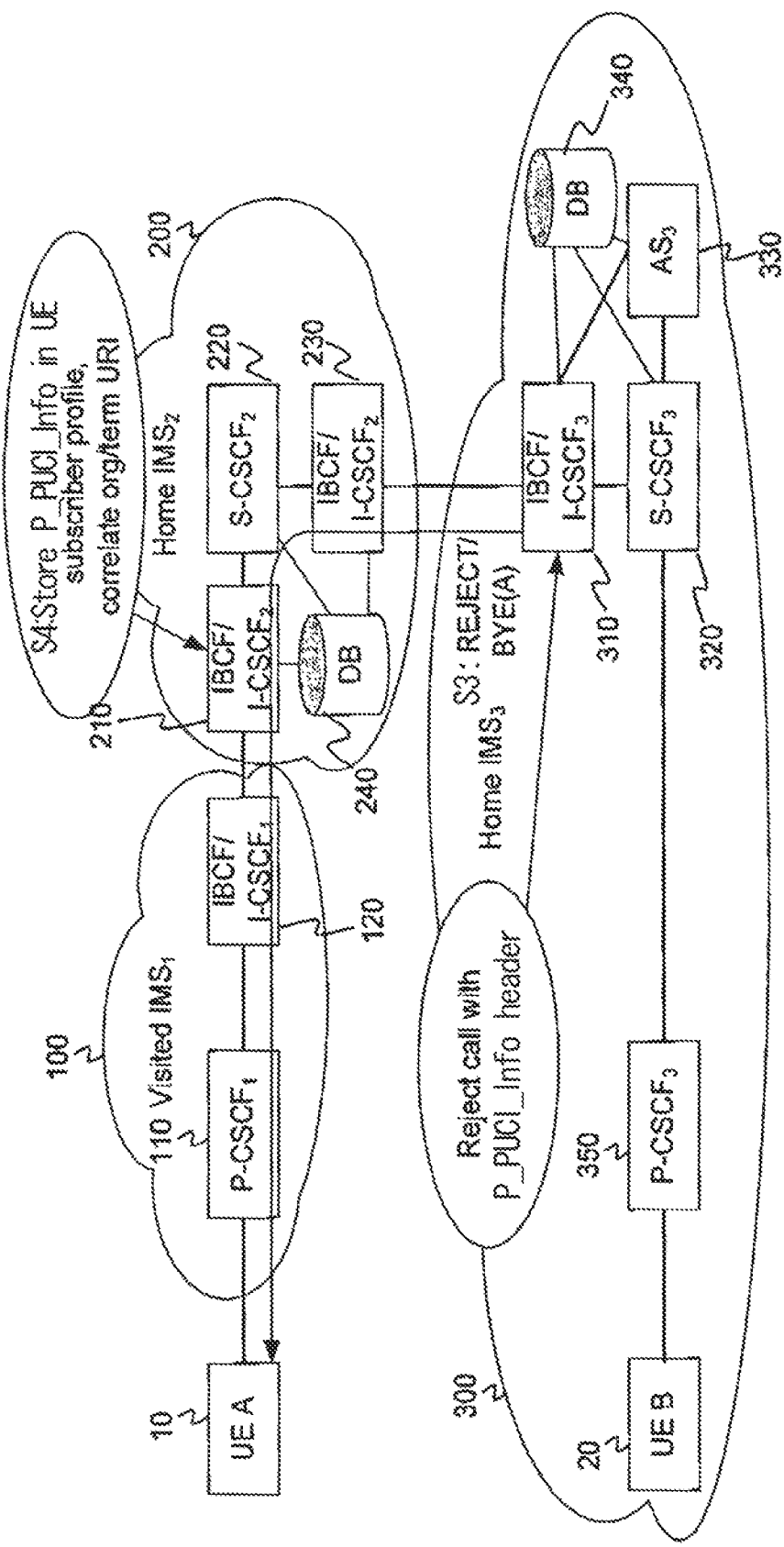
FIG. 2 is a block diagram of the PUCI system used for explaining steps S3 and S4 in processing calls.

In FIG. 2, the $IBCF/I-CSCF_3$ 310 rejects the incoming call so as to constitute the PUCI information (regarding the PUCI testing) in a REJECT message by use of a P-PUCI-Info header describing the PUCI testing and result. In addition, the database 340 of the Home $IMS_3$ is updated in accordance with the PUCI testing and result.
(Step S4)

When the REJECT message arrives at the edge node of the Home $IMS_3$ such as the $IBCF/I-CSCF_3$ 310 and as the $S-CSCF_3$ 320, the PUCI information is stored in the database 340 in correlation with an origination/termination URI (or org/term URI). Now, the user equipment 10 is recognized as a source originating an unsolicited communication toward the user equipment 20 in the Home $IMS_2$ 200.
(Step S5)

Figure 3:
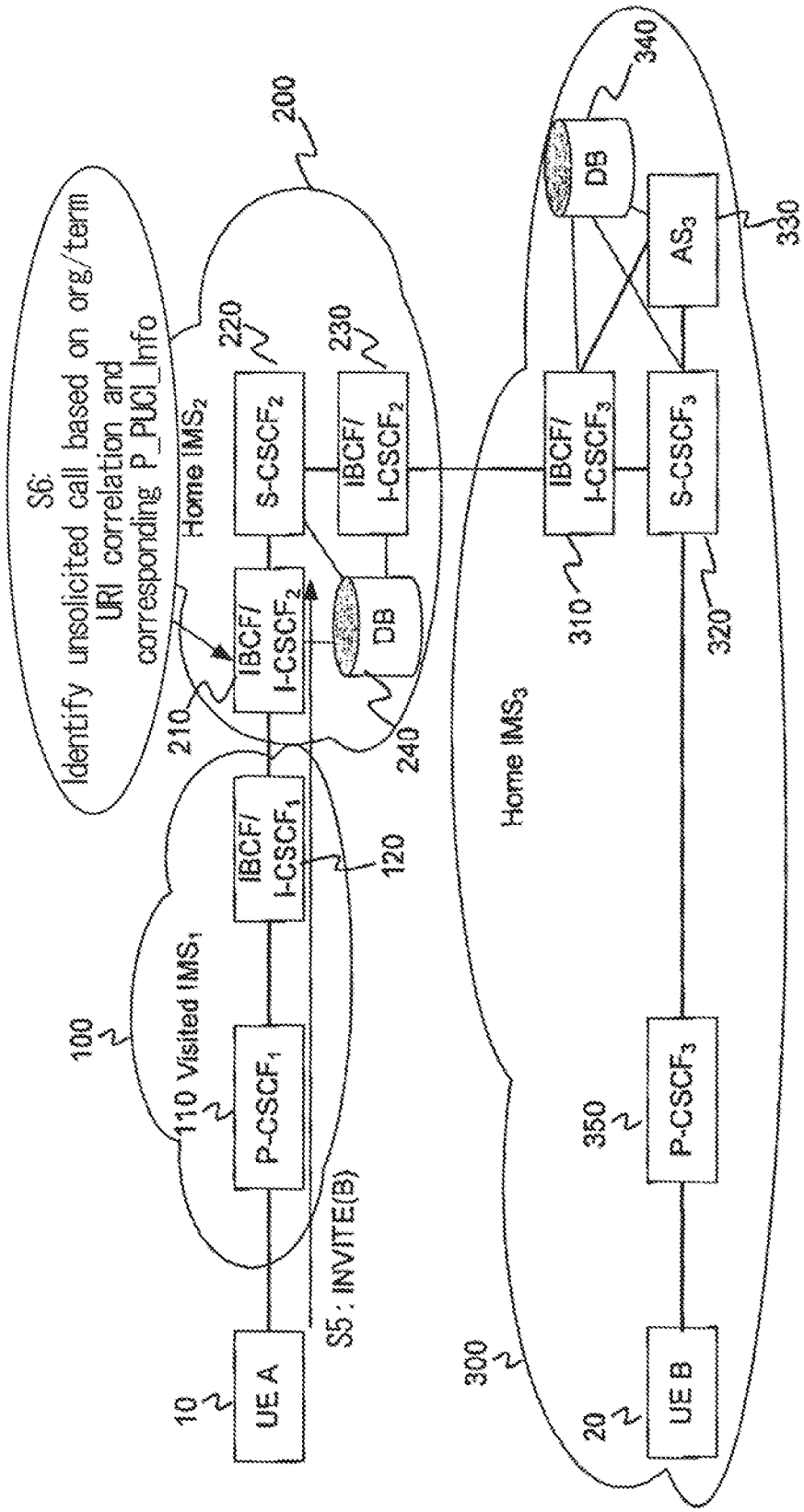
FIG. 3 is a block diagram of the PUCI system used for explaining steps S5 and S6 in processing calls.

In FIG. 3, the user equipment 10 resends an incoming call setup request toward the user equipment 20, which is routed to the Home $IMS_2$ 200.
(Step S6)

In the Home $IMS_2$ 200, either the $IBCF/I-CSCF_2$ 210/230 (ideally, serving as a first contact point) or the $S-CSCF_2$ 220 identifies the incoming call as the unsolicited call based on the previously received PUCI information.
(Step S7)

Figure 4:
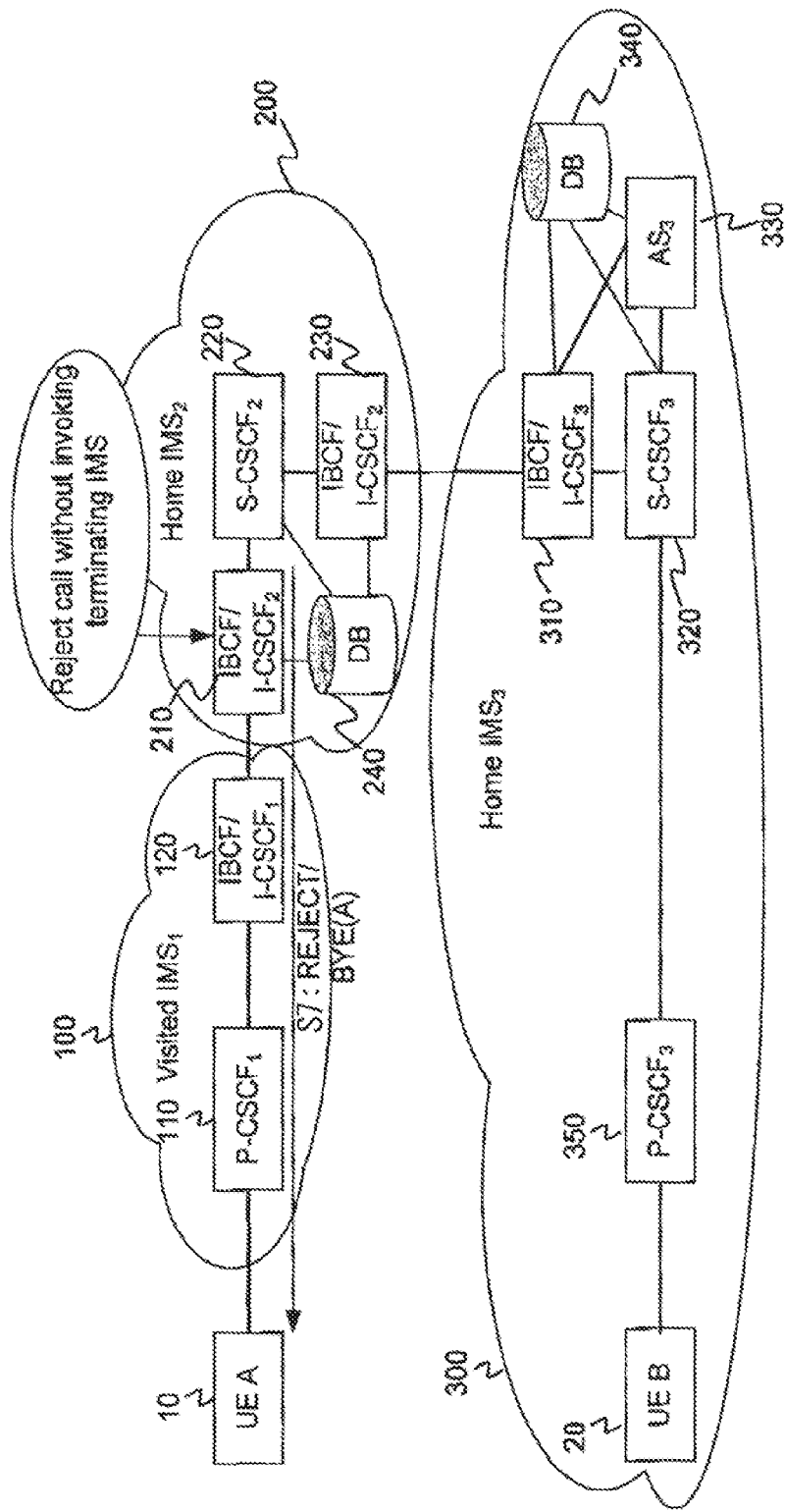
FIG. 4 is a block diagram of the PUCI system used for explaining step S7 in processing calls.

In FIG. 4, either the $IBCF/I-CSCF_2$ 210/230 or the $S-CSCF_2$ 220 rejects the incoming call as the user equipment 10 is marked as an unsolicited caller for the user equipment 20. Ideally, the $IBCF/I-CSCF_2$ 210/230 serves as a first entry point which rejects the incoming call without invoking the terminating IMS, i.e. the Home $IMS_3$ 300.

Lastly, the present invention is not necessarily limited to present embodiment, which can be further modified within the scope of the invention as defined by the appended claims.

The invention claimed is:

1. An internet protocol (IP) multimedia subsystem (IMS) node comprising:
    a hardware processor facilitating the utilization of information acquired from a Protection against Unsolicited Communication for IMS (PUCI) compliant database, wherein the hardware processor accesses the PUCI compliant database via read-only access;
    the hardware processor implementing, in the node, operations including:
        routing communication between user equipment over an IP multimedia network;
        upon establishing a new session for controlling transmission of an incoming call, querying the PUCI compliant database to read equipment information related to the incoming call;
        using the equipment information read from the PUCI compliant database to determine whether the new session is suspicious;
        when the new session is suspicious, carrying out one of:
            blocking the new session; and
            marking the new session as a suspicious session, and forwarding to a subsequent IMS node an indication of the new session as being suspicious ; and
        when the new session is not suspicious, allowing unimpeded communication, without substantial modification to the communication, through the node, of the incoming call.

2. The IMS node according to claim 1, wherein the PUCI compliant database equipment information includes at least one of a source SIP URI, a destination SIP URI, a source IP address, and a destination IP address, depending on a reason for blocking the session, as well as information regarding a source public land mobile network or operator (PLMN/Operator network), service delivery platform (SPD) information, an original session establishment or rejection time, a subsequent session establishment or rejection time, and a standardized PUCI test result.

3. The IMS node according to claim 1, wherein the PUCI compliant database equipment information serves as a flag indicating a release message or an error message in a single program initiator (a SIP BYE or ERROR message), included in an original session setup message, which is interpreted by a previous IMS node that obtains relevant information from a SIP header.

4. The IMS node according to claim 1, wherein the PUCI compliant database equipment information serves as a standardized code that informs the IMS node, which queries the PUCI compliant database, of a reason for rejection via an SIP BYE or ERROR message in an original session setup message, which is interpreted by a previous IMS node that obtains relevant PUCI information from a SIP header, wherein the relevant PUCI information is provided in a new SIP header.

5. The IMS node according to claim 1, wherein the PUCI compliant database equipment information serves as out-of-band signaling between the database and a PUCI application server.

6. The IMS node according to claim 1, wherein the node interprets a feedback from a PUCI application server and stores relevant PUCI information in either a global operator policy database or a local database, thus enabling the IMS node to reject an unsolicited call related to the blocked session.

7. The IMS node according to claim 1, wherein the PUCI compliant database querying functionality serves as a part of a core IMS functionality or a SIP-based system, thus providing the PUCI compliant database querying functionality in an edge of the Internet protocol multimedia network.

* * * * *